(12) United States Patent
Bao et al.

(10) Patent No.: US 11,222,178 B2
(45) Date of Patent: Jan. 11, 2022

(54) TEXT ENTITY EXTRACTION METHOD FOR EXTRACTING TEXT FROM TARGET TEXT BASED ON COMBINATION PROBABILITIES OF SEGMENTATION COMBINATION OF TEXT ENTITIES IN THE TARGET TEXT, APPARATUS, AND DEVICE, AND STORAGE MEDIUM

(71) Applicant: TENCENT TECHNOLOGY (SHENZHEN) COMPANY LTD, Guangdong (CN)

(72) Inventors: Hengyao Bao, Shenzhen (CN); Ke Su, Shenzhen (CN); Yi Chen, Shenzhen (CN); Mengliang Rao, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 190 days.

(21) Appl. No.: 16/425,027

(22) Filed: May 29, 2019

(65) Prior Publication Data

US 2019/0278843 A1   Sep. 12, 2019

Related U.S. Application Data

(63) Continuation of application No. PCT/CN2018/076274, filed on Feb. 11, 2018.

(30) Foreign Application Priority Data

Feb. 27, 2017   (CN) .......................... 201710107546.0

(51) Int. Cl.
  *G06F 40/295* (2020.01)
  *G10L 15/22* (2006.01)
  (Continued)

(52) U.S. Cl.
  CPC ........ *G06F 40/295* (2020.01); *G06F 16/3329* (2019.01); *G06F 16/3346* (2019.01);
  (Continued)

(58) Field of Classification Search
  CPC .............. G06F 40/295; G06F 16/3329; G06F 16/3346; G06F 40/30; G10L 15/22; G10L 15/26; G06N 20/00; G06N 7/005
  See application file for complete search history.

(56) References Cited

U.S. PATENT DOCUMENTS 5,839,106 A * 11/1998 Bellegarda .......... G10L 15/1815
                                                    704/257
6,415,250 B1   7/2002 Van Den Akker
(Continued)

FOREIGN PATENT DOCUMENTS

| CN | 1819018 A | 8/2006 |
| CN | 101187921 A | 5/2008 |

(Continued)

OTHER PUBLICATIONS

First Review Notice of CN 201710107546.0 dated Nov. 5, 2018.
(Continued)

*Primary Examiner* — Michael N Opsasnick
(74) *Attorney, Agent, or Firm* — Sughrue Mion, PLLC

(57) ABSTRACT

A text entity extraction method, apparatus, and storage medium are provided. The method includes determining candidate text entities in a target text. Portions of the candidate text entities are combined to generate candidate segmentation combinations corresponding to the target text, the candidate text entities in each candidate segmentation combination being different. A combination probability corresponding to each candidate segmentation combination is calculated, where the combination probability is a probability that grammar is correct when the target text uses the
(Continued)

candidate segmentation combination. A target segmentation combination corresponding to the target text is determined according to the combination probabilities. A text entity is extracted from the target text according to the target segmentation combination.

18 Claims, 9 Drawing Sheets

(51) Int. Cl.
  *G06N 20/00* (2019.01)
  *G06F 16/33* (2019.01)
  *G06F 16/332* (2019.01)
  *G10L 15/26* (2006.01)

(52) U.S. Cl.
  CPC .............. *G06N 20/00* (2019.01); *G10L 15/22* (2013.01); *G10L 15/26* (2013.01)

(56) References Cited

U.S. PATENT DOCUMENTS

| | | | |
|---|---|---|---|
| 8,027,832 B2 | 9/2011 | Ramsey et al. | |
| 8,744,833 B2 | 6/2014 | Maeda et al. | |
| 2008/0120102 A1* | 5/2008 | Rao | G10L 15/22 704/235 |
| 2009/0319257 A1* | 12/2009 | Blume | G06F 40/58 704/7 |
| 2010/0318526 A1* | 12/2010 | Nakazawa | G06F 40/30 707/749 |
| 2011/0060587 A1* | 3/2011 | Phillips | G10L 15/30 704/235 |
| 2011/0184723 A1 | 7/2011 | Huang et al. | |
| 2011/0320185 A1* | 12/2011 | Broshi | G06F 40/55 704/4 |
| 2012/0041753 A1* | 2/2012 | Dymetman | G06F 40/289 704/4 |
| 2014/0163951 A1* | 6/2014 | Nikoulina | G06F 40/295 704/4 |
| 2014/0207439 A1* | 7/2014 | Venkatapathy | G06F 40/274 704/4 |
| 2014/0337005 A1* | 11/2014 | Abdel-Hady | G06F 16/35 704/2 |
| 2015/0199339 A1* | 7/2015 | Mirkin | G06F 16/3337 704/2 |
| 2015/0310005 A1* | 10/2015 | Ryger | G06F 16/3334 707/706 |
| 2017/0091164 A1* | 3/2017 | Bao | G06F 40/284 |
| 2017/0133010 A1* | 5/2017 | Printz | G10L 15/19 |

FOREIGN PATENT DOCUMENTS

| | | |
|---|---|---|
| CN | 101208689 A | 6/2008 |
| CN | 105279149 A | 1/2016 |
| CN | 105869642 A | 8/2016 |
| CN | 105988978 A | 10/2016 |
| CN | 106227719 A | 12/2016 |
| CN | 106250490 A | 12/2016 |
| GN | 106910501 A | 6/2017 |

OTHER PUBLICATIONS

Second Review Notice of CN 201710107546.0 dated Jul. 10, 2018.
International Search Report for PCT/CN2018/076274 dated May 9, 2018 (PCT/ISA/210).

* cited by examiner

TEXT ENTITY EXTRACTION METHOD FOR EXTRACTING TEXT FROM TARGET TEXT BASED ON COMBINATION PROBABILITIES OF SEGMENTATION COMBINATION OF TEXT ENTITIES IN THE TARGET TEXT, APPARATUS, AND DEVICE, AND STORAGE MEDIUM

CROSS-REFERENCE TO RELATED APPLICATIONS

This Application is a continuation of International Application No. PCT/CN2018/076274, filed on Feb. 11, 2018, which is based on and claim priority from Chinese Patent Application No. 201710107546.0 filed with the China National Intellectual Property Administration on Feb. 27, 2017, the entire contents of which are herein incorporated by reference in their entireties.

BACKGROUND

1. Field

The disclosure relates to the field of text extraction, and in particular, to a text entity extraction method, apparatus, and device, and a storage medium.

2. Description of Related Art

With continuous development of human computer interaction technologies, more intelligent devices are starting to be equipped with a natural language cognitive function. When using such intelligent devices, a user only needs to initiate a natural language instruction, so that the intelligent devices can perform cognitive analysis on the natural language instruction, and perform a corresponding operation according to an analysis result. A core of a cognitive analysis technology lies in how to extract a specific text entity from the natural language instruction. For example, when the received natural language instruction instructs to play a song, the intelligent devices need to extract a text entity such as a singer name and/or a song name from the natural language instruction through the cognitive analysis technology.

In the field of text extraction, a text entity is usually extracted from a natural language instruction based on template matching. When extracting the text entity from the natural language instruction in a manner of template matching, an intelligent device matches the obtained natural language instruction with a large quantity of preset templates, and extracts the corresponding text entity from the natural language instruction according to a matched preset template. For example, a natural language instruction obtained by the intelligent device is "I want to listen to a song B of a singer A", and the intelligent device finds a matched preset template "I want to listen to [song] of [singer]", thereby extracting text entities "singer A" and "song B" according to the template.

However, due to uncertainty of the natural language instruction, to reach a relatively good cognitive effect, a developer needs to set a large quantity of templates in advance. Consequently, much time needs to be expended during template matching. In addition, when no completely matched template is found, the intelligent device cannot extract the corresponding text entity from the natural language instruction.

SUMMARY

It is an aspect to provide a text entity extraction method, apparatus, and device, and a storage medium, to resolve a problem that much time needs to be expended during template matching, and when no completely matched template is found, a corresponding text entity cannot be extracted from a natural language instruction.

According to an aspect of one or more embodiments, there is provided a method. The method includes determining candidate text entities in a target text. Portions of the candidate text entities are combined to generate candidate segmentation combinations corresponding to the target text, the candidate text entities in each candidate segmentation combination being different. A combination probability corresponding to each candidate segmentation combination is calculated, where the combination probability is a probability that grammar is correct when the target text uses the candidate segmentation combination. A target segmentation combination corresponding to the target text is determined according to the combination probabilities. A text entity is extracted from the target text according to the target segmentation combination.

According to other aspects of one or more embodiments, there is provided an apparatus and computer readable medium consistent with the method.

BRIEF DESCRIPTION OF THE DRAWINGS

Various embodiments will be described below with reference to the drawings, in which.

DETAILED DESCRIPTION

Figure 1:
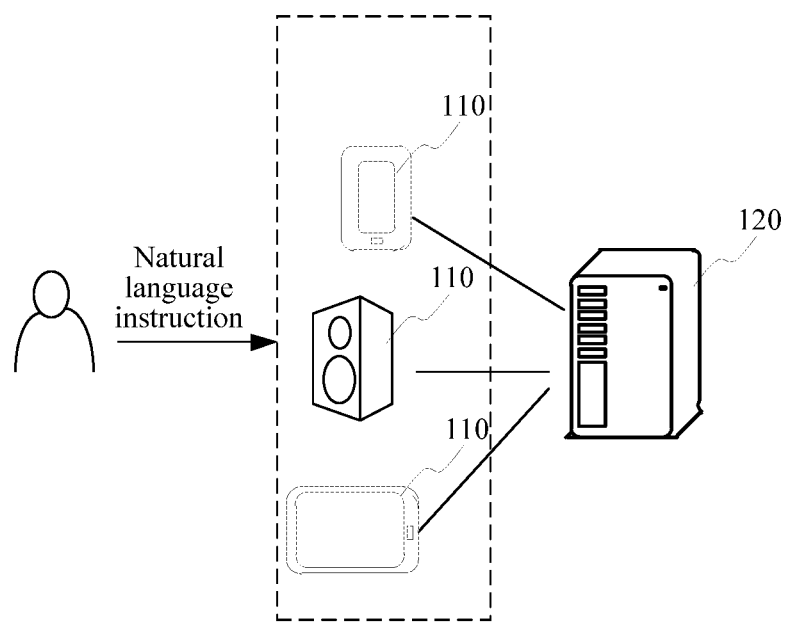
FIG. 1 is a schematic diagram of an implementation environment according to an embodiment.

To make the objectives, technical solutions, and advantages of the present disclosure clearer, the following further describes implementations of the present disclosure in detail with reference to the accompanying drawings.

"Plurality of" mentioned in the specification means two or more. "And/or" describes an association relationship of associated objects and represents that three relationships may exist. For example, A and/or B may represent the following three cases: Only A exists, both A and B exist, and only B exists. The character "/" generally indicates an "or" relationship between the associated objects.

For ease of understanding, the following explains terms used in describing various embodiments.

A text refers to a word string including several words. The text in the embodiments may be a short text. The short text is a natural language text including only a small quantity of sentences. In the field of human computer interaction, the short text usually refers to a natural language instruction sent by a user. For example, the short text may be: I want to listen to a song B sung by a singer A; check weather in Beijing tomorrow, and so on.

A text entity is used for indicating a phrase of a specific type or having a specific meaning in a text. In some embodiments, the text entity is a person name, a geographical name, a song name, an album name, an item name, or the like included in the text. For example, the text "I want to listen to a song B sung by a singer A" includes text entities "singer A" and "song B".

An N-Grammar (N-Gram) model is a model used for calculating a probability that text grammar (or referred to as grammar) is correct. Common N-Gram models include a binary Bi-Gram model and a triple Tri-Gram model. The N-Gram model is based on the following assumption: a probability that a text element in a text appears is only related to previous N−1 text elements, and is not related to another text element in the text, and a probability that grammar of an entire text is correct is a product of probabilities that text elements appear.

In the embodiments, the N-Gram model may be used for indicating a probability that N text elements are combined in order. The probability is obtained by counting the quantity of times that N text elements in a corpus resource appear simultaneously. For example, the N-Gram model is used for indicating a probability that text elements "I" and "want to" are combined in order of "I want to" or a probability that the text elements "I" and "want to" are combined in order of "want I".

According to various embodiments described below, candidate text entities included in a target text are obtained, and the candidate text entities are combined to generate candidate segmentation combinations corresponding to the target text, to determine, according to a combination probability corresponding to each candidate segmentation combination, a target segmentation combination corresponding to the target text. A text entity is extracted from the target text according to the target segmentation combination. Compared with a related art text entity extraction based on preset templates, in the embodiments, text entity extraction does not depend on the preset templates, and time expended by preliminary configuration is shortened. In addition, compared with template matching, a target segmentation combination is more quickly determined in a manner of probability calculation, and a problem that the text entity extraction fails because no matched template is found may be avoided.

FIG. 1 is a schematic diagram of an implementation environment according to an embodiment. The implementation environment includes intelligent devices 110 and a server 120.

The intelligent devices 110 are electronic devices having a data processing function. The electronic device is a smartphone, a tablet computer, an intelligent sound box, a wearable intelligent device, or a smart household device. In a possible implementation, the intelligent devices 110 have a natural language cognitive analysis function. To be specific, the intelligent device 110 may perform corresponding operations according to a received natural language instruction. The natural language instruction is a voice instruction initiated by a user or a word instruction entered by a user. For example, when the intelligent device 110 is an intelligent sound box, the intelligent sound box may perform operations such as playing music and checking weather according to the voice instruction of the user. When the intelligent device 110 is a smart household device, the smart household device may provide a corresponding smart household service according to the voice instruction of the user.

The intelligent devices 110 are connected to the server 120 through a wired or wireless network.

The server 120 is a background server of the intelligent devices 110. The background server is a server cluster including several servers or a cloud computing center. In a possible implementation, the server 110 is configured to generate an N-Gram model according to a corpus resource, and provide the N-Gram model for the intelligent devices 110, so that the intelligent devices 110 extract a text entity (namely, natural language cognitive analysis) from the natural language instruction according to the N-Gram model, thereby performing a corresponding operation according to the extracted text entity. In addition, the server 110 is further configured to receive user corpus data collected by the intelligent devices 110, and optimize the N-Gram model according to the user corpus data, to further provide the optimized N-Gram model for the intelligent devices 110.

In another possible implementation, when the intelligent devices 110 have a voice collection function, the intelligent devices 110 are further configured to send obtained natural language instructions to the server 120. After the server 120 converts the natural language instructions into texts, the server 120 extracts, according to a trained N-Gram model, text entities included in the texts, and returns the extracted text entities to the intelligent devices 110, so that intelligent devices 110 perform corresponding operations according to the text entities.

In another possible implementation, when the intelligent devices 110 have voice collection and voice-text conversion functions, the intelligent devices 110 are configured to convert obtained natural language instructions to texts, and then send the texts to the server 120. The server 120 extracts, according to a trained N-Gram model, text entities included in the texts, and returns the extracted text entities to the intelligent devices 110, so that the intelligent devices 110 perform corresponding operations according to the text entities.

In some embodiments, the wireless network or the wired network uses a standard communications technology and/or protocol. The network is usually the Internet, but may also be any network, including but not limited to any combination of a local area network (LAN), a metropolitan area network (MAN), a wide area network (WAN), a mobile, wired or wireless network, and a private network or a virtual private network). In some embodiments, data exchanged through a network is represented by using a technology and/or format including a hyper text mark-up language (HTML), an extensible markup language (XML), or the like. In addition, all or some links may further be encrypted by using conventional encryption technologies such as a Secure Socket Layer (SSL), a Transport Layer Security (TLS), a virtual private network (VPN), and an Internet Protocol Security (IPsec). In some other embodiments, the data communications technologies may further be replaced or supplemented by using customized and/or dedicated data communications technologies.

The text entity extraction method provided in the embodiments is applied to the intelligent devices 110 or the server 120. For ease of description, in the following embodiments that the text entity extraction method is applied to the server 120 is used as an example for description, and this does not constitute a limitation.

Figure 2:
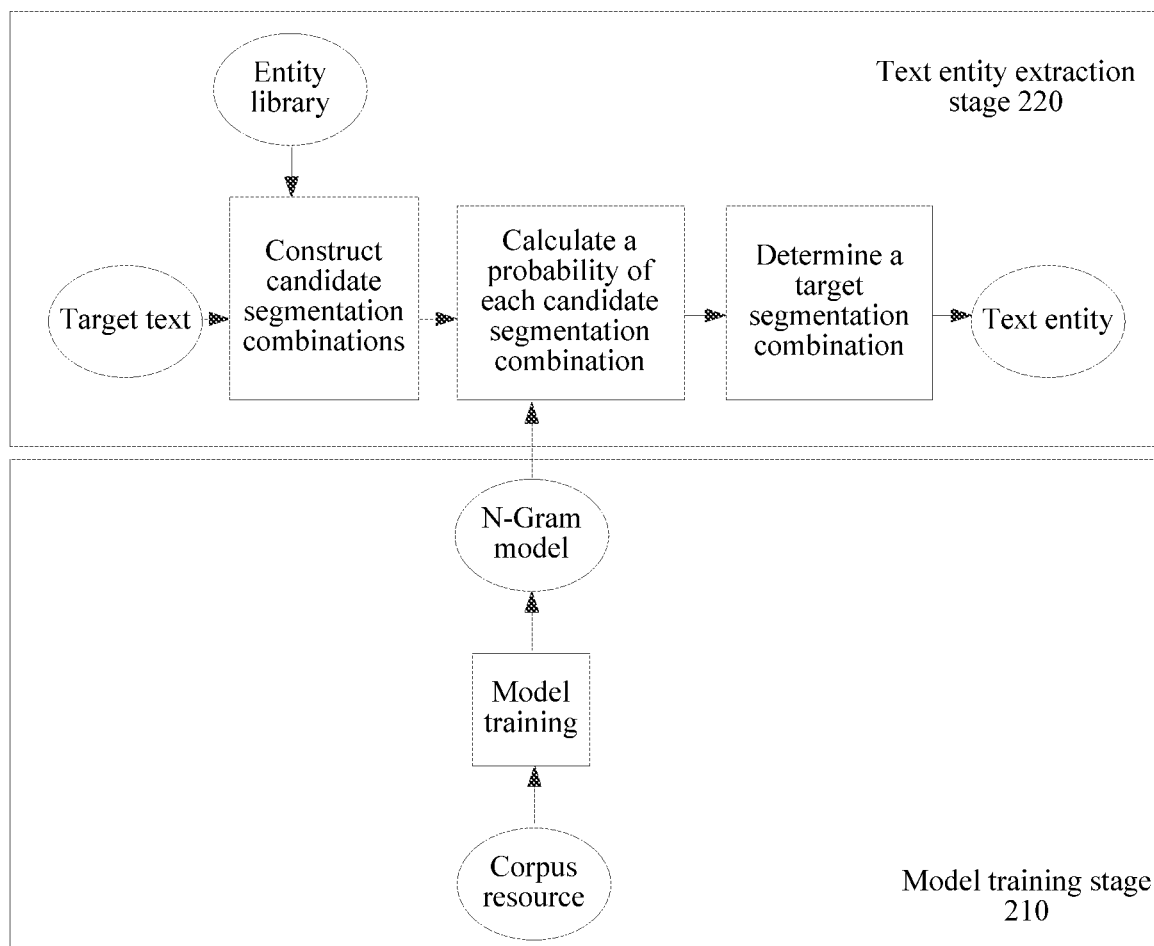
FIG. 2 is a schematic diagram of a principle of a text entity extraction method according to an embodiment.

Different from being based on template matching, as shown in FIG. 2, a text entity extraction method in an embodiment mainly includes a model training stage 210 and a text entity extraction stage 220. In the model training stage 210, a server trains an N-Gram model by analyzing and collecting statistics on a preset corpus resource. The preset corpus resource is at least one of preset templates and corpus data carrying an annotation. In the text entity extraction stage 220, the server first determines, according to an entity library, candidate text entities included in a target text, and constructs candidate segmentation combinations according to the determined candidate text entities, then calculates a probability of each candidate segmentation combination according to the N-Gram model obtained through training in the model training stage 210, further determines a target segmentation combination according to the probability of each candidate segmentation combination, and finally extracts a text entity from the target text according to the target segmentation combination. Schematic embodiments are used below for description.

Figure 3:
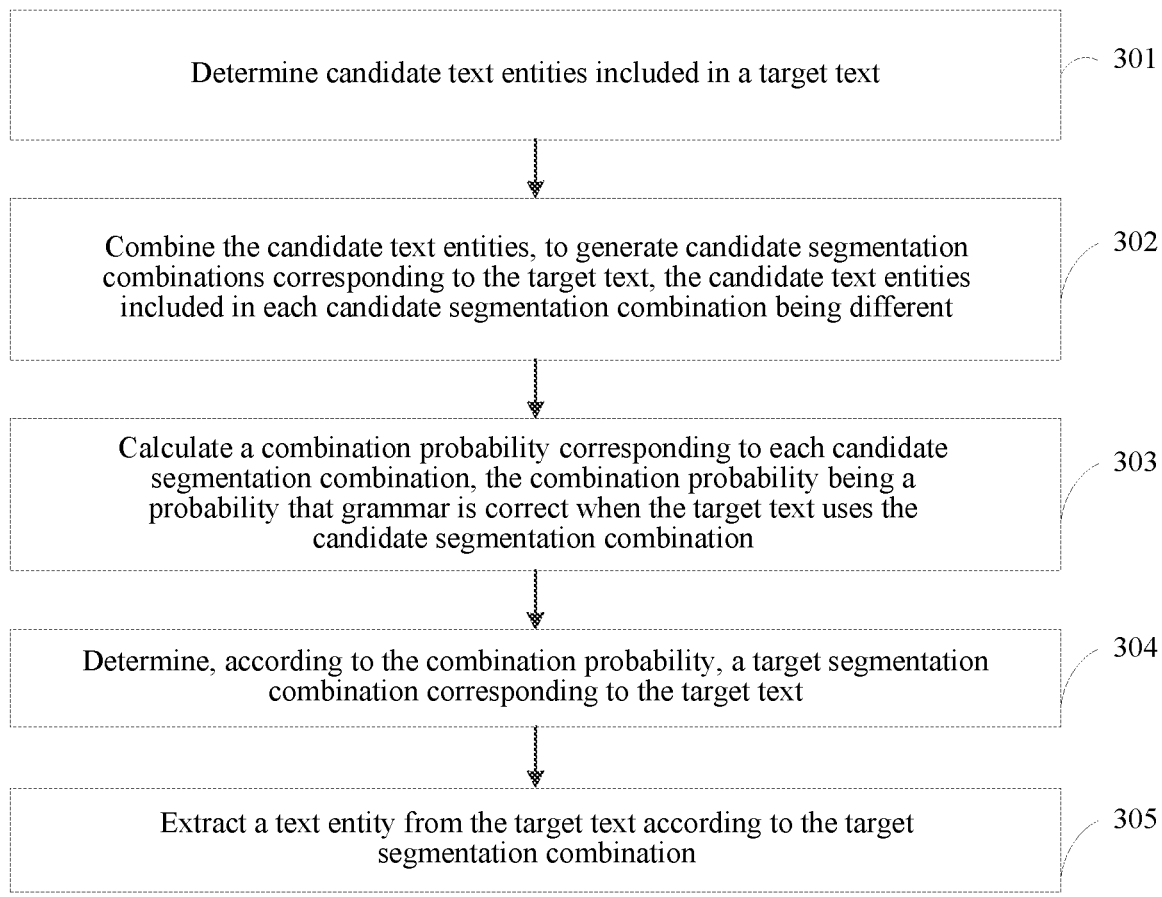
FIG. 3 is a flowchart of a text entity extraction method according to an embodiment.

FIG. 3 is a flowchart of a text entity extraction method according to an embodiment. In this embodiment, that the text entity extraction method is applied to the server 120 shown in FIG. 1 is used as an example for description. The method includes:

Step 301: Determine candidate text entities included in a target text.

In some embodiments, the target text is obtained through conversion by an intelligent device according to a received natural language instruction. The natural language instruction is a collected voice instruction or a received word instruction entered by a user.

In some embodiments, the server determines, according to a target field to which the target text belongs, the candidate text entities included in the target text and entity types corresponding to the candidate text entities.

For example, when the target field to which the target text belongs is a music field, the candidate text entities determined by the server include a singer A, a singer a, and a song B. Entity types corresponding to the singer A and the singer a are singer names, and an entity type corresponding to the song B is a song name.

Step 302: Combine the candidate text entities, to generate candidate segmentation combinations corresponding to the target text, the candidate text entities included in each candidate segmentation combination being different.

After determining the candidate text entities, the server further combines the candidate text entities, to generate several candidate segmentation combinations corresponding to the target text, namely, several segmentation manners corresponding to the target text.

The candidate segmentation combination includes candidate text entities and other text content than the candidate text entities. The other text content includes a subject (for example, "I"), a conjunction (for example, "of"), an adjective (for example, "popular"), a verb (for example, "sing"), or the like.

In a possible implementation, the server performs permutation and combination on candidate text entities having different the entity types, thereby generating candidate text entity combinations covering all combination manners.

For example, candidate text entities determined by the server include a singer A, a singer a (entity types of the singer A and the singer a are both singer names), and a song B (an entity type is a song name), and five candidate text entity combinations are generated. The five candidate text entity combinations are: (the singer A), (the singer a), (the song B), (the singer A and the song B), and (the singer a and the song B).

Step 303: Calculate a combination probability corresponding to each candidate segmentation combination, the combination probability being a probability that grammar is correct when the target text uses the candidate segmentation combination.

In some embodiments, for each candidate segmentation combination, the server calculates, according to a pre-trained N-Gram model, the combination probability corresponding to the candidate segmentation combination. The combination probability is used for indicating the probability that grammar is correct when the target text uses the candidate segmentation combination, and a higher combination probability indicates a higher probability that grammar is correct when the target text uses the candidate segmentation combination. To be specific, higher accuracy of segmentation performed when the target text uses the candidate segmentation combination indicates that using the candidate segmentation combination more conforms to actual semantics of the target text.

Step 304: Determine, according to the combination probability, a target segmentation combination corresponding to the target text.

In some embodiments, the server compares the combination probabilities corresponding to the candidate segmentation combinations, and determines a candidate segmentation combination having a highest combination probability as the target segmentation combination corresponding to the target text. To be specific, it is determined that the target text uses a candidate segmentation combination in which a probability that grammar is correct is highest for segmentation.

Step 305: Extract a text entity from the target text according to the target segmentation combination.

In some embodiments, after extracting the corresponding text entity from the target text according to the target segmentation combination, the server feeds back the text entity to an intelligent device, so that the intelligent device performs a corresponding operation according to the text entity.

For example, the server extracts text entities, namely, a singer A and a song B from the target text, and feeds back the text entities to an intelligent sound box. The intelligent sound box plays, according to the received text entities, the song B sung by the singer A.

In an actual implementation process, the server first needs to construct entity libraries in different fields, and trains an N-Gram model according to a small quantity of corpus resources. In a text entity extraction stage, the server determines, according to the entity libraries, the candidate text entities included in the target text, and calculates a combination probability of each candidate segmentation combination by using the trained N-Gram model. Schematic embodiments are used below for description.

Figure 4A:
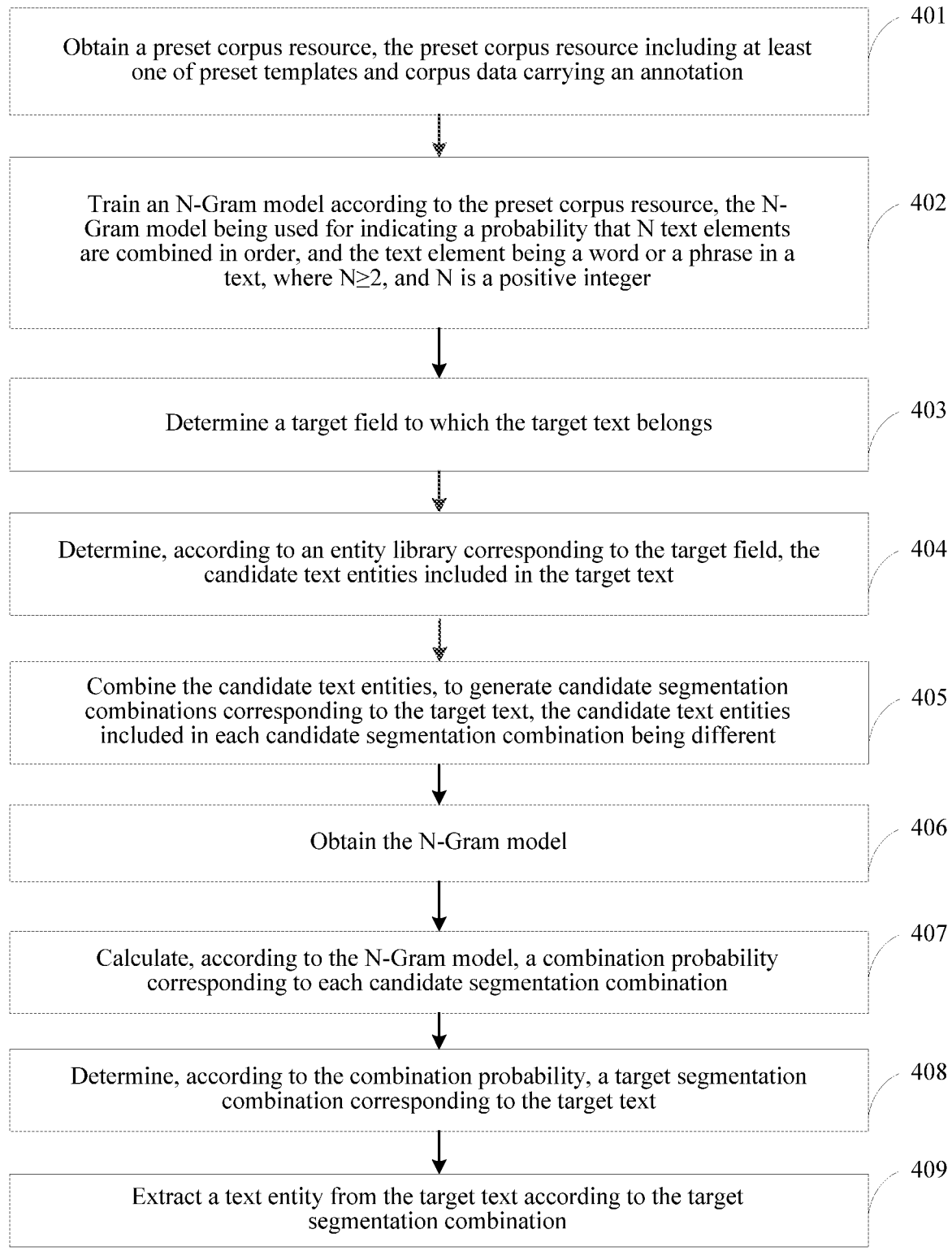
FIG. 4A is a flowchart of a text entity extraction method according to another embodiment.

FIG. 4A is a flowchart of a text entity extraction method according to another embodiment. In this embodiment, that the text entity extraction method is applied to the server 120 shown in FIG. 1 is used as an example for description. The method includes:

Step 401: Obtain a preset corpus resource, the preset corpus resource including at least one of preset templates and corpus data carrying an annotation.

The preset templates are a small quantity of templates manually written by a developer. The corpus data is network corpus data that a server captures from a network or user corpus data reported by an intelligent device. The annotation carried in the corpus data is used for indicating an entity in a corpus and an entity category to which the entity belongs. In some embodiments, the network corpus data may be an article, a comment, or the like published on the network.

In a possible implementation, when a relatively small amount of corpus data is available, the server obtains the small quantity of preset templates manually written by the developer, and as corpus data increases, the server obtains the user corpus data (carrying the annotation) reported by the intelligent device while obtaining the preset templates.

In some embodiments, different fields correspond to different preset corpus resources. For example, for a music field, the preset corpus resource includes preset music-related templates and/or music-related corpus data carrying an annotation. For a smart household field, the preset corpus resource includes preset smart household control instruction-related templates and/or smart household device-related corpus data carrying an annotation.

Schematically, for the music field, the preset templates manually written by the developer and obtained by the server include:

(1) I want to listen to [song] of [singer];
(2) who sings [song];
(3) is there [song] in [album]; and
(4) Who sings [song].

The text entity [singer] is used for indicating a singer name, the text entity [song] is used for indicating a song name, and the text entity [album] is used for indicating an album name.

For ease of description, in this embodiment, an example is used for description based on the foregoing example, and this does not constitute a limitation.

Step 402: Train an N-Gram model according to the preset corpus resource, the N-Gram model being used for indicating a probability that N text elements are combined in order, and the text element being a word or a phrase in a text, where N≥2, and N is a positive integer.

In some embodiments, for preset corpus resources in different fields, the server generates an N-Gram model corresponding to each field. For example, the server generates a music-related N-Gram model according to a preset corpus resource in a music field; and generates a smart household-related N-Gram model according to a preset corpus resource in a smart household field.

In a possible implementation, the preset corpus resource obtained by the server includes preset templates. The server counts a first quantity of times that the N text elements in the preset templates appear simultaneously, and counts a second quantity of times that the N text elements are combined in different orders, thereby calculating, according to the first quantity of times and the second quantity of times, the probability that the N text elements are combined in order.

For example, if the server counts that the quantity of times that two text elements, namely, "I" and "want to" (where both are words) in the preset templates appear simultaneously is 1, and the quantity of times that the two text elements are combined in order of "I want to" is 1, a probability that the two text elements, namely, "I" and "want to" are combined in order of "I want to" is 1/1=1.0.

For another example, if the server counts that the quantity of times that two text elements, namely, "[song]" and "of" (where the former is a phrase, and the latter is a word) in the preset templates appear simultaneously is 2, and the quantity of times that the two text elements are combined in order of "[song] of" is 1, a probability that the two text elements, namely, "[song]" and "of" are combined in order of "[song] of" is ½=0.5.

In some embodiments, when obtaining the corpus data carrying the annotation, the server optimizes the generated N-Gram model according to the corpus data, to improve accuracy of the N-Gram model, thereby achieving a better text entity extraction effect.

For example, with reference to the foregoing embodiment, when obtained corpus data is "Ode to the Yangtze river sung by Zhang Xiaosi is really great", and "Zhang Xiaosi" is annotated as "singer", and "Ode to the Yangtze river" is annotated as "song", the server updates the quantity of times that two text elements, namely, "[song]" and "of", appear simultaneously to 3, and updates a probability that the two text elements, namely, "[song]" and "of", are combined in order of "[song] of" to 2/3.

Step 403: Determine a target field to which the target text belongs.

Different fields correspond to different entity libraries. Therefore, to improve accuracy of subsequently determining candidate text entities, after obtaining the target text, the server first determines the target field to which the target text belongs, and further determines, according to an entity library corresponding to the target field, the candidate text entities included in the target text.

In a possible implementation, after obtaining the target text, the server identifies a keyword included in the target text, and determines, according to the keyword, the target field to which the target text belongs.

For example, the target text obtained by the server is "I want to listen to Common Jasmine Orange of Jay Chou", and the server identifies that the target text includes a keyword "listen to", thereby determining that the target field is a music field.

In another possible implementation, the server may further determine, according to a service provided by an intelligent device, the target field to which the target text belongs. This embodiment does not limit a specific manner of determining the target field by the server.

Step 404: Determine, according to an entity library corresponding to the target field, the candidate text entities included in the target text, the entity library including vocabularies that belong to the target field.

Further, after determining the target field to which the target text belongs, the server obtains the entity library corresponding to the target field, and determines, according to the entity library, the candidate text entities included in the target text. The entity library includes a large quantity of related vocabularies in the target field.

For example, the server determines the target field is a music field, and obtains music-related entity libraries. The entity libraries include a singer entity library (including a large quantity of singer names), a song entity library (including a large quantity of song names), and an album entity library (including a large quantity of album names).

In a possible implementation, to improve speed of determining the candidate text entities, the server uses a trie tree to determine the candidate text entities included in the target text.

Schematically, the server determines, according to the singer entity library and the song name entity library, that the candidate text entities included in the target text "I want to listen to Ode to the Yangtze river of Zhang Xiaosi" are respectively Zhang Xiao (singer name), Zhang Xiaosi (singer name), and Ode to the Yangtze river (song name).

Step 405: Combine the candidate text entities, to generate candidate segmentation combinations corresponding to the target text, the candidate text entities included in each candidate segmentation combination being different.

After determining all the candidate text entities included in the target text, the server combines the candidate text entities, and generates, based on combined candidate text entities, several candidate segmentation combinations corresponding to the target text, namely, several segmentation manners corresponding to the target text.

Schematically, if the server obtains the target text "I want to listen to Ode to the Yangtze river of Zhang Xiaosi", and determines that the candidate text entities include "Zhang Xiao", "Zhang Xiaosi" and "Ode to the Yangtze river", generated candidate segmentation combinations corresponding to the target text are shown in Table 1.

TABLE 1

| Number | Candidate segmentation combination | [singer] | [song] |
|---|---|---|---|
| 1 | I want to listen to Ode to the Yangtze river of [singer] | Zhang Xiaosi | — |
| 2 | I want to listen to Ode to the Yangtze river of [singer] four | Zhang Xiao | — |
| 3 | I want to listen to [song] of Zhang Xiaosi | — | Ode to the Yangtze river |
| 4 | I want to listen to [song] of [singer] | Zhang Xiaosi | Ode to the Yangtze river |
| 5 | I want to listen to [song] of [singer] four | Zhang Xiao | Ode to the Yangtze river |

A candidate text entity included in a candidate segmentation combination whose number is 1 is "Zhang Xiaosi"; a candidate text entity included in a candidate segmentation combination whose number is 2 is "Zhang Xiao"; a candidate text entity included in a candidate segmentation combination whose number is 3 is "Ode to the Yangtze river"; candidate text entities included in a candidate segmentation combination whose number is 4 are "Zhang Xiaosi" and "Ode to the Yangtze river"; and candidate text entities included in a candidate segmentation combination whose number is 5 are "Zhang Xiao" and "Ode to the Yangtze river".

Step 406: Obtain the N-Gram model.

After generating the candidate segmentation combinations corresponding to the target text, the server obtains the N-Gram model trained in step 402.

In some embodiments, to improve accuracy of subsequently calculating a combination probability, the server obtains, according to the target field to which the target text belongs, the N-Gram model corresponding to the target field.

Step 407: Calculate, according to the N-Gram model, a combination probability corresponding to each candidate segmentation combination.

Further, the server calculates, according to the N-Gram model, the combination probability corresponding to each candidate segmentation combination, to be specific, calculates a probability that grammar is correct when the target text uses a corresponding candidate segmentation combination.

Figure 4B:
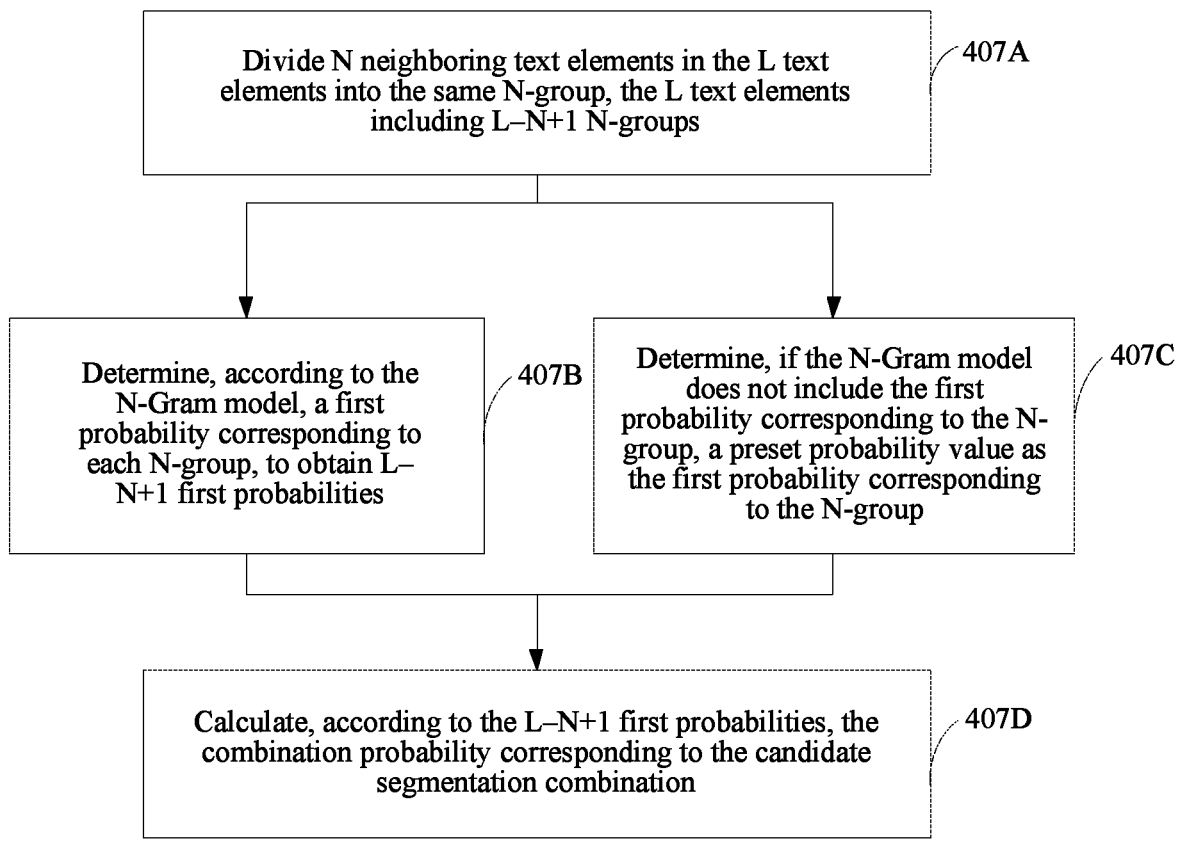
FIG. 4B is a flowchart of a combination probability calculation process in the text entity extraction method shown in FIG. 4A.

In a possible implementation, the N-Gram model is used for indicating the probability that the N text elements are combined in order. Therefore, when calculating a combination probability of a candidate segmentation combination, the server divides the text elements in the candidate segmentation combination into several N-groups, and calculates the combination probability of the candidate segmentation combination according to a probability corresponding to each N-group. As shown in FIG. 4B, the step includes the following steps.

Step 407A: Divide N neighboring text elements in the L text elements into the same N-group, the L text elements including L−N+1 N-groups.

Figure 4C:
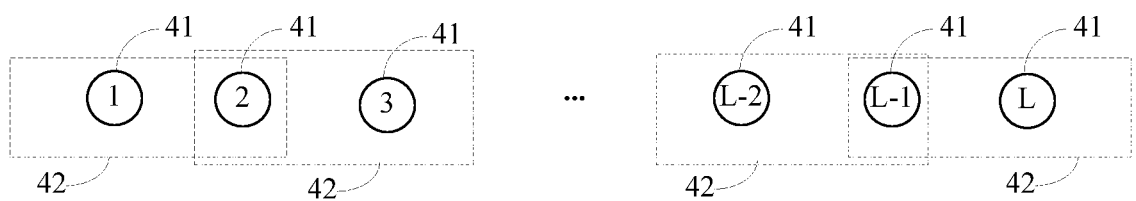
FIG. 4C is a schematic diagram of implementing an N-group division process in a candidate segmentation combination.

As shown in FIG. 4C, a candidate segmentation combination corresponding to the target text includes L text elements 41 (where sequence numbers are respectively 1 to L). The L text elements include candidate text entities and text content (a word or a phrase) in the target text other than the candidate text entities.

The server divides the N neighboring text elements in the L text elements into the same N-group, thereby generating L−N+1 N-groups.

When the obtained N-Gram model is a binary Bi-Gram model, as shown in FIG. 4C, the server divides two neighboring text elements in the L text elements into the same Bi-group 42, thereby generating L−1 Bi-groups 42. When the obtained N-Gram model is a triple Tri-Gram model, the server divides three neighboring text elements in the L text elements into the same Tri-group, thereby generating L−2 Tri-groups.

Schematically, for the candidate segmentation combination "I want to listen to [song] of [singer]" whose number is 4 in Table 1, the candidate segmentation combination includes six text elements, respectively, "I", "want to", "listen to", "[singer]", "of", and "[song]". The server divides two neighboring text elements in the six text elements into the same Bi-group, to obtain five Bi-groups, respectively (I, want to), (want to, listen to), (listen to, [singer]), ([singer], of), and (of, [song]).

For another example, for the candidate segmentation combination "I want to listen to [song] of [singer] four" whose number is 5 in Table 1, the candidate segmentation combination includes seven text elements, respectively, "I", "want to", "listen to", "[singer]", "four", "of", and "[song]". The server divides two neighboring text elements in the seven text elements into the same Bi-group, to obtain six Bi-groups, respectively, (I, want to), (want to, listen to), (listen to, [singer]), ([singer], four), (four, of), and (of, [song]).

In another possible implementation, the server may further divide at least two neighboring text elements into the same N-group. In this embodiment, only dividing into a Bi-group is used as an example for schematic description, and this does not constitute a limitation on the present disclosure.

Step 407B: Determine, according to the N-Gram model, a first probability corresponding to each N-group, to obtain L−N+1 first probabilities, the first probability being a probability that N text elements in the N-group are combined in order.

Further, the server determines, according to the trained N-Gram model, the first probability corresponding to each N-group obtained through division.

When the N-Gram model is trained by using only a small quantity of preset templates, accuracy of the N-Gram model is relatively low, and a relatively small quantity of N-groups are covered. Correspondingly, the server possibly cannot find an N-group matching the N-group obtained through division in the N-Gram model, and further cannot determine a first probability corresponding to the N-group. To enable the N-Gram model to have a paradigm capability, in a possible implementation, when the N-Gram model includes an N-group matching the N-group obtained through division, the server determines a first probability of the N-group according to the N-Gram model; and when the N-Gram model does not include an N-group matching the N-group obtained through division, the server determines, by using step 407C below, a first probability corresponding to the N-group.

Step 407C: Determine, if the N-Gram model does not include the first probability corresponding to the N-group, a preset probability value as the first probability corresponding to the N-group.

If the N-Gram model does not include the first probability corresponding to the N-group obtained through division, the server determines the preset probability value as the first probability corresponding to the N-group. The preset probability value is usually relatively small. For example, the preset probability value is $10^{-6}$.

Step 407D: Calculate, according to the L−N+1 first probabilities, the combination probability corresponding to the candidate segmentation combination.

Through steps 407A to 407C, the server calculates the first probability corresponding to each N-group.

In some embodiments, when calculating the combination probability corresponding to the candidate segmentation combination, the server obtains a first probability (L−N+1 first probabilities are obtained in total) corresponding to an N-group including an $(i-N+1)^{th}$ text element to an $i^{th}$ text element, and multiplies the obtained first probabilities, thereby determining a multiplication result as the combination probability corresponding to the candidate segmentation combination.

In a possible implementation, the server calculates, according to the L−N+1 first probabilities through a probability calculation formula, the combination probability corresponding to the candidate segmentation combination. The probability calculation formula is:

$$p(s) = \prod_i^L p(w_i|w_{i-1}| \ldots |w_{i-N+1}).$$

p(s) is the combination probability, and $p(w_i|w_{i-1}| \ldots |w_{i-N+1})$ is the first probability corresponding to the N-group including the $(i-N+1)^{th}$ text element to the $i^{th}$ text element, where N≤i≤L, and i is a positive integer.

With reference to the embodiment shown in step 407B, a combination probability corresponding to the candidate segmentation combination whose number is 4 is p(want to|I)× p(listen to|want to)×p([singer]|listen to)×p(of|[singer])×p ([song]|of).

The server repeats steps 407B to 407D, to calculate the combination probability of each candidate segmentation combination corresponding to the target text.

Schematically, the combination probability of each candidate segmentation combination that is calculated by the server is shown in Table 2.

TABLE 2

| Number | Candidate segmentation combination | [singer] | [song] | Combination probability |
|---|---|---|---|---|
| 1 | I want to listen to Ode to the Yangtze river of [singer] | Zhang Xiaosi | — | 0.08 |
| 2 | I want to listen to Ode to the Yangtze river of [singer] four | Zhang Xiao | — | 0.02 |
| 3 | I want to listen to [song] of Zhang Xiaosi | — | Ode to the Yangtze river | 0.07 |
| 4 | I want to listen to [song] of [singer] | Zhang Xiaosi | Ode to the Yangtze river | 0.14 |
| 5 | I want to listen to [song] of [singer] four | Zhang Xiao | Ode to the Yangtze river | 0.04 |

Step 408: Determine, according to the combination probability, a target segmentation combination corresponding to the target text.

According to the calculated combination probabilities, the server determines the target segmentation combination corresponding to the target text. A higher probability that grammar is correct when the target text uses the target segmentation combination indicates that using the target segmentation combination for segmentation more conforms to actual semantics of the target text.

Figure 4D:
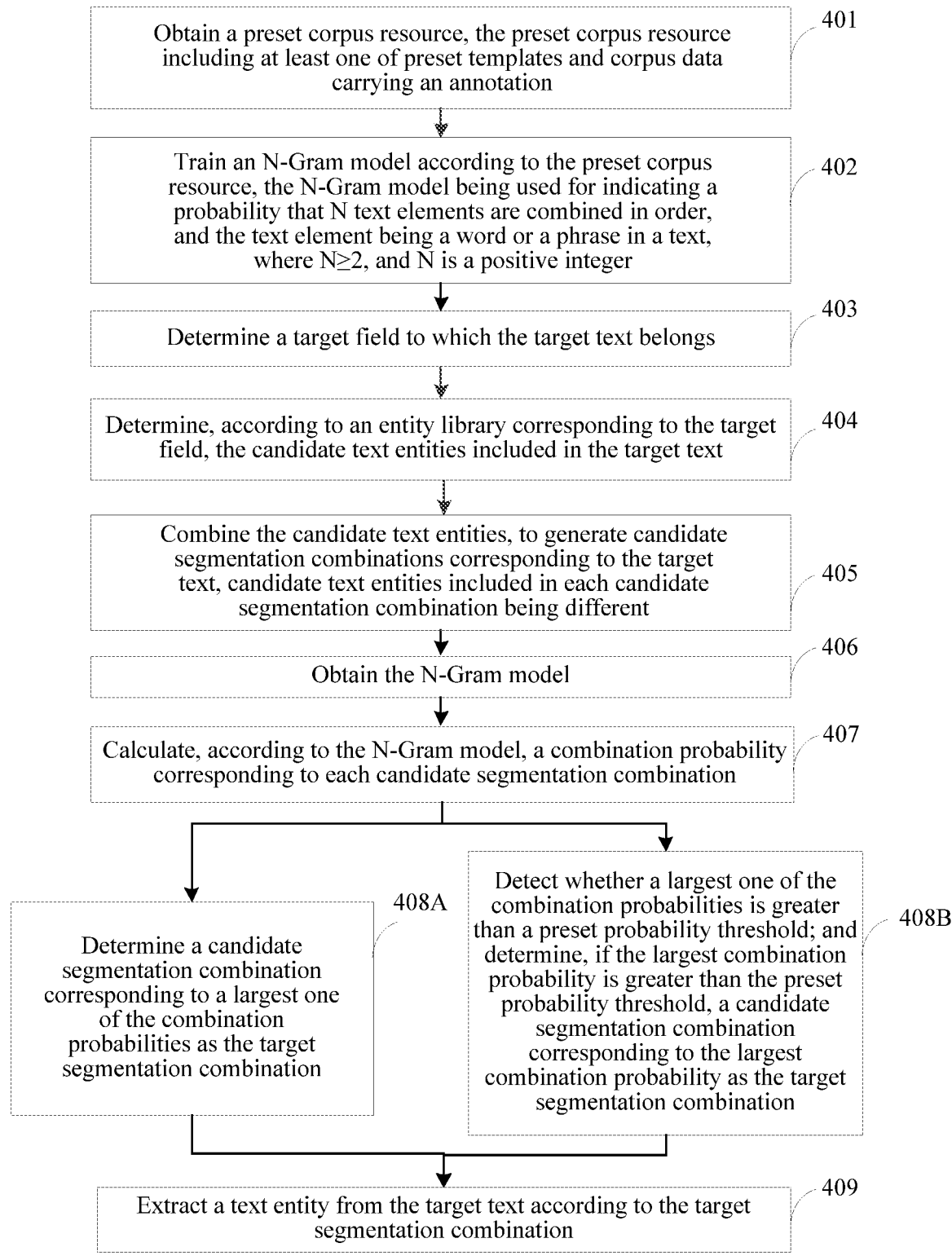
FIG. 4D is a flowchart of a text entity extraction method according to still another embodiment.

In a possible implementation, based on FIG. 4A, as shown in FIG. 4D, the step includes the following steps.

Step 408A: Determine a candidate segmentation combination corresponding to a largest one of the combination probabilities as the target segmentation combination.

For example, with reference to Table 2, a value of the combination probability corresponding to the candidate segmentation combination whose number is 4 is the largest, and the server determines "I want to listen to [song] of [singer]" as the target segmentation combination.

Step 408B: Detect whether a largest one of the combination probabilities is greater than a preset probability threshold; and determine, if the largest combination probability is greater than the preset probability threshold, a candidate segmentation combination corresponding to the largest combination probability as the target segmentation combination.

To further improve accuracy of text entity extraction, after obtaining the largest combination probability, the server further detects whether the largest combination probability is greater than the preset probability threshold. If the largest combination probability is greater than the preset probability threshold, the candidate segmentation combination corresponding to the largest combination probability is determined as the target segmentation combination. If the largest combination probability is less than the preset probability threshold (to be specific, actual meaning of the target text may be expressed even through the candidate segmentation combination corresponding to the largest combination probability is used for segmentation), extracting a text entity from the target text is stopped.

For example, when the preset probability threshold is 0.005, and the calculated combination probabilities corresponding to the candidate segmentation combinations are respectively 0.004, 0.0001, and 0.0015, the largest combination probability (namely, 0.004) is less than the preset probability threshold. Therefore, it is determined that a text entity cannot be extracted from the target text.

In some embodiments, for the target text from which a text entity cannot be extracted, the server sends the target text for manually processing, and receives a text entity manually annotated.

Step 409: Extract a text entity from the target text according to the target segmentation combination.

In some embodiments, the server extracts the corresponding text entity from the target text according to a segmentation manner indicated by the target segmentation combination.

For example, with reference to the foregoing embodiment, the server extracts text entities "Zhang Xiaosi" and "Ode to the Yangtze river" from a target text "I want to listen to Ode to the Yangtze river of Zhang Xiaosi" according to a segmentation manner indicated by a target segmentation combination "I want to listen to [song] of [singer]".

In some embodiments, the server performs validity check and/or association check on extracted text entities, and feeds back the text entities to the intelligent device when the text entities are valid and/or the text entities are associated, so that the intelligent device performs a corresponding operation according to the text entities.

To improve accuracy of text entity extraction, in a possible implementation, the server obtains feedback information sent by the intelligent device, where the feedback information is used for indicating whether an extracted text entity is correct, and when the feedback information indicates that the text entity is incorrect, performs reverse correction on the N-Gram model by using the incorrectly extracted text entity as reverse correction corpus data.

In this embodiment, the server generates an N-Gram model according to a small quantity of corpus resources, and calculates a combination probability of each candidate segmentation combination by using the N-Gram model, thereby avoiding configuring a large quantity of matching templates in an earlier stage. This is applicable to an initial stage in which there are a relatively small quantity of corpus resources.

In this embodiment, before determining the candidate text entities, the server predetermines the target field to which the target text belongs, thereby mining, by using the entity library corresponding to the target field, the candidate text entities included in the target text, and further improving accuracy of the determined candidate text entities.

The following is an apparatus embodiment in the embodiments, and for parts not described in detail in the apparatus embodiment, reference may be made to the foregoing method embodiment that is in one-to-one correspondence with the apparatus embodiment.

Figure 5:
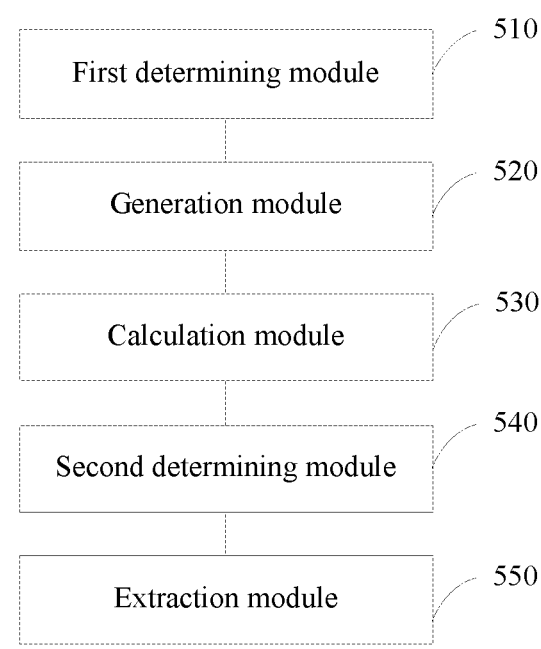
FIG. 5 is a structural block diagram of a text entity extraction apparatus according to an embodiment.

FIG. 5 is a structural block diagram of a text entity extraction apparatus according to an embodiment. The text entity extraction apparatus becomes all or a part of the server 120 in FIG. 1 through hardware or a combination of software and hardware. The text entity extraction apparatus includes a first determining module 510, a generation module 520, a calculation module 530, a second determining module 540, and an extraction module 550.

The first determining module 510 is configured to implement the function of step 301.

The generation module 520 is configured to implement the function of step 302 or 405.

The calculation module 530 is configured to implement the function of step 303.

The second determining module 540 is configured to implement the function of step 304 or 408.

The extraction module 550 is configured to implement the function of step 305 or 409.

In some embodiments, the apparatus further includes an obtaining module and a training module.

The obtaining module is configured to implement the function of step 401.

The training module is configured to implement the function of step 402.

The calculation module 530 includes an obtaining unit and a calculation unit.

The obtaining module is configured to implement the function of step 406.

The calculation module is configured to implement the function of step 407.

In some embodiments, a candidate segmentation combination includes L text elements. The L text elements include candidate text entities and text content in the target text other than the candidate text entities.

The calculation unit is further configured to implement the functions of steps 407A to 407D.

In some embodiments, the first determining module 510 includes a first determining unit and a second determining unit.

The first determining unit is configured to implement the function of step 403.

The second determining unit is configured to implement the function of step 404.

In some embodiments, the second determining module 540 includes a third determining unit and a fourth determining unit.

The third determining unit is configured to implement the function of step 408A.

The fourth determining unit is configured to implement the function of step 408B.

Figure 6:
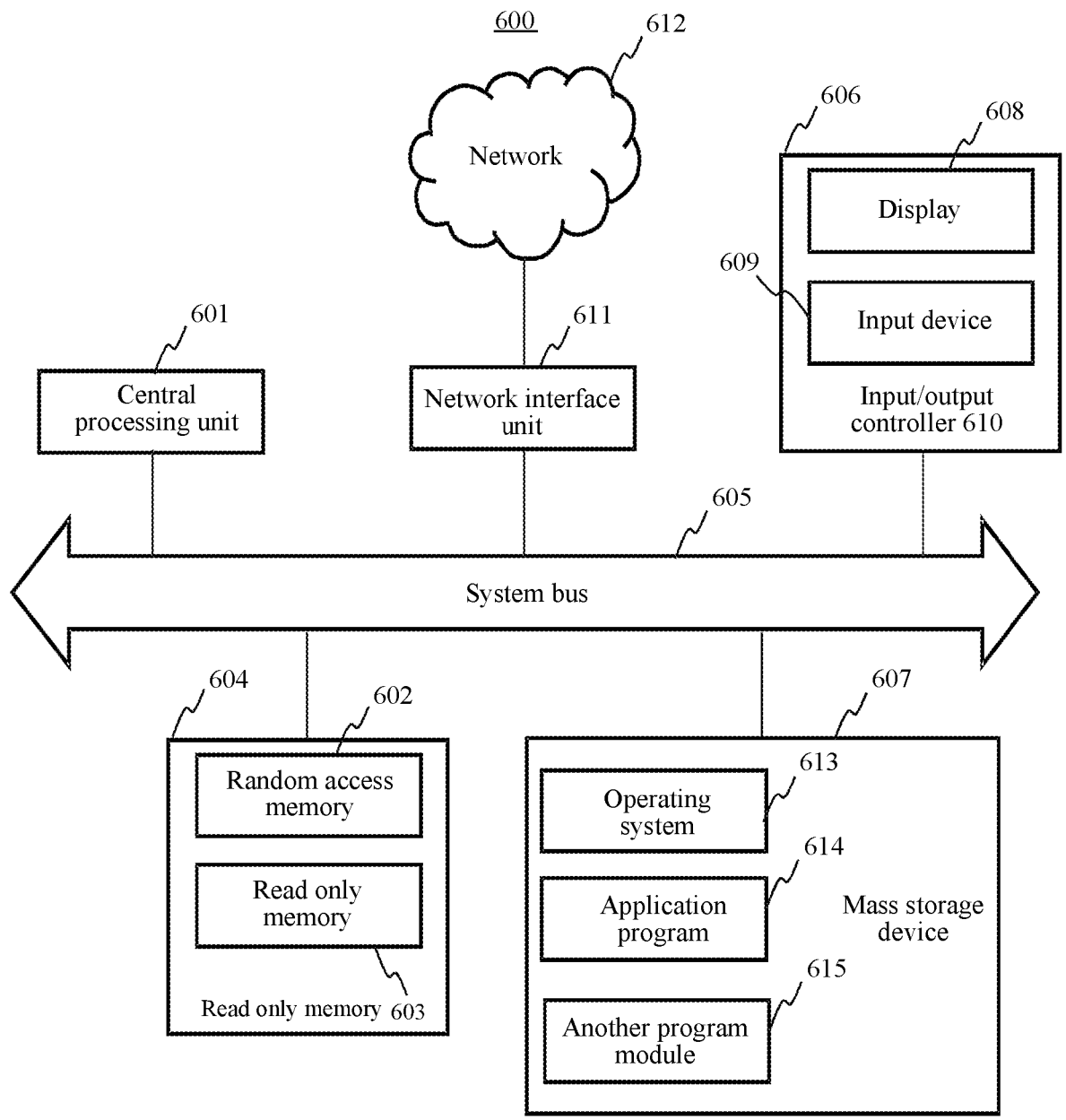
FIG. 6 is a structural block diagram of a text entity extraction device according to an embodiment.

FIG. 6 is a structural block diagram of a text entity extraction device according to an embodiment. The device 600 is implemented as the text entity extraction apparatus in the foregoing embodiment. The device 600 may be a server. Specifically:

The device 600 includes a central processing unit (CPU) 601, a system memory 604 including a random access memory (RAM) 602 and a read only memory (ROM) 603, and a system bus 605 connecting the system memory 604 and the CPU 601. The device 600 further includes a basic input/output system (I/O system) 606 configured to transmit information between components in a computer, and a mass storage device 607 configured to store an operating system 613, an application program 614, and another program module 615.

The basic I/O system 606 includes a display 608 configured to display information, and an input device 609 used by a user to input information, such as a mouse or a keyboard. The display 608 and the input device 609 are connected to an input/output controller 610 of the system bus 605, to be connected to the CPU 601. The basic I/O system 606 may further include the input/output controller 610, to receive and process an input from a plurality of other devices such as a keyboard, a mouse, and an electronic stylus. Similarly, the input/output controller 610 further provides an output to a display screen, a printer, or another type of output device.

The mass storage device 607 is connected to the CPU 601 by using a mass storage controller (not shown) connected to the system bus 605. The mass storage device 607 and an associated computer readable medium provide non-volatile storage for the device 600. That is, the mass storage device 607 may include a computer readable medium (not shown), such as a hard disk or a CD-ROM drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing types. The system memory 604 and the mass storage device 607 may be collectively referred to as a memory.

According to the embodiments, the device 600 may further be connected to a remote computer on a network through a network, such as the Internet. That is, the device 600 may be connected to a network 612 by using a network interface unit 611 connected to the system bus 605, or may be connected to another type of network or a remote computer system (not shown) by using a network interface unit 611.

The embodiments further provide a computer-readable storage medium. The storage medium stores at least one instruction. The at least one instruction is loaded and executed by a processor to implement the text entity extraction method according to the foregoing method embodiments.

The embodiments further provide a computer program product. The computer program product stores at least one instruction. The at least one instruction is loaded and executed by a processor to implement the text entity extraction method according to the foregoing method embodiments.

The sequence numbers of the embodiments are merely for description purpose but do not indicate any preference of the embodiments.

The foregoing descriptions are merely embodiments, but are not intended to limit the present disclosure. Any modification, equivalent replacement, improvement, or the like made within the spirit and principle of the present disclosure shall fall within the protection scope of the present disclosure and the appended claims.

What is claimed is:

1. A method comprising:
obtaining a preset corpus resource comprising a plurality of preset templates and/or corpus data including an annotation; and
training an N-Grammar (N-Gram) model according to the preset corpus resource, the N-Gram model indicating a probability that N text elements are combined in order, each text element being a word or a phrase in a text, wherein N≥2, and N is a positive integer;
determining, by at least one processor, a plurality of candidate text entities comprised in a target text;
combining, by the at least one processor, portions of the plurality of candidate text entities, to generate a plurality of candidate segmentation combinations corresponding to the target text, the candidate text entities comprised in each candidate segmentation combination being different;
calculating, by the at least one processor, a combination probability corresponding to each candidate segmentation combination, the combination probability being a probability that grammar is correct when the target text uses the candidate segmentation combination;
determining, by the at least one processor according to the combination probabilities, a target segmentation combination corresponding to the target text; and
extracting, by the at least one processor, a text entity from the target text according to the target segmentation combination,
wherein the combination probability is calculated according to the N-Gram model, and
wherein the candidate segmentation combination comprises L text elements, and the L text elements comprise the plurality of candidate text entities, and text content in the target text other than the plurality of candidate text entities; and
the calculating comprises:
dividing N neighboring text elements in the L text elements into the same N-group, the L text elements comprising L−N+1 N-groups;
determining, according to the N-Gram model, a first probability corresponding to each N-group, to obtain L−N+1 first probabilities, the first probability being a probability that N text elements in the N-group are combined in order; and
calculating, according to the L−N+1 first probabilities, the combination probability corresponding to the candidate segmentation combination.

2. The method according to claim 1, wherein before the calculating, according to the L−N+1 first probabilities, the combination probability, the method further comprises:
determining, in response to the N-Gram model not including the first probability corresponding to the N-group, a preset probability value as the first probability corresponding to the N-group.

3. The method according to claim 1, wherein the calculating, according to the L−N+1 first probabilities, the combination probability comprises:
obtaining a first probability corresponding to an N-group comprising an $(i-N+1)^{th}$ text element to an $i^{th}$ text element, wherein N≤i≤L, and i is a positive integer; and
multiplying the L−N+1 first probabilities that are obtained, and determining a multiplication result as the combination probability corresponding to the candidate segmentation combination.

4. The method according to claim 1, wherein the determining the plurality of candidate text entities comprises:
determining a target field to which the target text belongs; and
determining, according to an entity library corresponding to the target field, the plurality of candidate text entities comprised in the target text, the entity library comprising vocabularies that belong to the target field.

5. The method according to claim 1, wherein a candidate segmentation combination corresponding to a largest one of the combination probabilities is determined as the target segmentation combination.

6. The method according to claim 1, wherein the determining the target segmentation combination comprises:
detecting whether a largest one of the combination probabilities is greater than a probability threshold; and based on a largest combination probability being greater than the probability threshold, determining a candidate segmentation combination corresponding to the largest combination probability as the target segmentation combination.

7. An apparatus comprising:
at least one memory configured to store computer program code; and
at least one processor configured to access the at least one memory and operate according to the computer program code, the computer program code including:
corpus obtaining code configured to cause at least one of the at least one processor to obtain a preset corpus resource comprising a plurality of preset templates and/or corpus data including an annotation; and
training code configured to cause at least one of the at least one processor to train an N-Grammar (N-Gram) model according to the preset corpus resource, the N-Gram model indicating a probability that N text elements are combined in order, each text element being a word or a phrase in a text, wherein $N \geq 2$, and N is a positive integer;
first determining code configured to cause at least one of the at least one processor to determine a plurality of candidate text entities comprised in a target text;
combining code configured to cause at least one of the at least one processor to combine portions of the plurality of candidate text entities, to generate a plurality of candidate segmentation combinations corresponding to the target text, the candidate text entities comprised in each candidate segmentation combination being different;
calculating code configured to cause at least one of the at least one processor to calculate a combination probability corresponding to each candidate segmentation combination, the combination probability being a probability that grammar is correct when the target text uses the candidate segmentation combination;
second determining code configured to cause at least one of the at least one processor to determine, according to the combination probabilities, a target segmentation combination corresponding to the target text; and
extracting code configured to cause at least one of the at least one processor to extract a text entity from the target text according to the target segmentation combination,
wherein the combination probability is calculated according to the N-Gram model, and
wherein the candidate segmentation combination comprises L text elements, and the L text elements comprise the plurality of candidate text entities, and text content in the target text other than the plurality of candidate text entities; and
the calculating code comprises:
dividing code configured to cause at least one of the at least one processor to divide N neighboring text elements in the L text elements into the same N-group, the L text elements comprising L−N+1 N-groups;
third determining code configured to cause at least one of the at least one processor to determine, according to the N-Gram model, a first probability corresponding to each N-group, to obtain L−N+1 first probabilities, the first probability being a probability that N text elements in the N-group are combined in order; and
calculating subcode configured to cause at least one of the at least one processor to calculate, according to the L−N+1 first probabilities, the combination probability corresponding to the candidate segmentation combination.

8. The apparatus according to claim 7, wherein the computer program code further comprises:
fourth determining code configured to cause at least one of the at least one processor to determine, in response to the N-Gram model not including the first probability corresponding to the N-group, a preset probability value as the first probability corresponding to the N-group, and
wherein the fourth determining code is executed by the at least one processor before the calculating subcode.

9. The apparatus according to claim 7, wherein the calculating subcode comprises:
obtaining code configured to cause at least one of the at least one processor to obtain a first probability corresponding to an N-group comprising an $(i-N+1)^{th}$ text element to an $i^{th}$ text element, wherein $N \leq i \leq L$, and i is a positive integer; and
multiplying code configured to cause at least one of the at least one processor to multiply the L−N+1 first probabilities that are obtained, and determine a multiplication result as the combination probability corresponding to the candidate segmentation combination.

10. The apparatus according to claim 7, wherein the first determining code comprises:
first determining subcode configured to cause at least one of the at least one processor to determine a target field to which the target text belongs; and
second determining subcode configured to cause at least one of the at least one processor to determine, according to an entity library corresponding to the target field, the plurality of candidate text entities comprised in the target text, the entity library comprising vocabularies that belong to the target field.

11. The apparatus according to claim 7, wherein a candidate segmentation combination corresponding to a largest one of the combination probabilities is determined as the target segmentation combination.

12. The apparatus according to claim 7, wherein the second determining code comprises:
detecting code configured to cause at least one of the at least one processor to detect whether a largest one of the combination probabilities is greater than a probability threshold; and
determining subcode configured to cause at least one of the at least one processor to, based on a largest combination probability being greater than the probability threshold, determine a candidate segmentation combination corresponding to the largest combination probability as the target segmentation combination.

13. A non-transitory computer readable storage medium storing computer program code which, when executed by at least one processor, performs operations comprising:
obtaining a preset corpus resource comprising a plurality of preset templates and/or corpus data including an annotation; and
training an N-Grammar (N-Gram) model according to the preset corpus resource, the N-Gram model indicating a probability that N text elements are combined in order, each text element being a word or a phrase in a text, wherein $N \geq 2$, and N is a positive integer;
determining a plurality of candidate text entities comprised in a target text;
combining portions of the plurality of candidate text entities, to generate a plurality of candidate segmentation combinations corresponding to the target text, the candidate text entities comprised in each candidate segmentation combination being different;

calculating a combination probability corresponding to each candidate segmentation combination, the combination probability being a probability that grammar is correct when the target text uses the candidate segmentation combination;

determining, according to the combination probabilities, a target segmentation combination corresponding to the target text; and extracting a text entity from the target text according to the target segmentation combination, wherein the combination probability is calculated according to the N-Gram model, and wherein the candidate segmentation combination comprises L text elements, and the L text elements comprise the plurality of candidate text entities, and text content in the target text other than the plurality of candidate text entities; and the calculating comprises:

dividing N neighboring text elements in the L text elements into the same N-group, the L text elements comprising L−N+1 N-groups;

determining, according to the N-Gram model, a first probability corresponding to each N-group, to obtain L−N+1 first probabilities, the first probability being a probability that N text elements in the N-group are combined in order; and calculating, according to the L−N+1 first probabilities, the combination probability corresponding to the candidate segmentation combination.

14. The non-transitory computer readable storage medium according to claim 13, wherein before the calculating, according to the L−N+1 first probabilities, the combination probability, the computer program code which, when executed by the at least one processor, further performs operations comprising:

determining, in response to the N-Gram model not including the first probability corresponding to the N-group, a preset probability value as the first probability corresponding to the N-group.

15. The non-transitory computer readable storage medium according to claim 13, wherein the calculating, according to the L−N+1 first probabilities, the combination probability comprises:

obtaining a first probability corresponding to an N-group comprising an $(i-N+1)^{th}$ text element to an $i^{th}$ text element, wherein $N \leq i \leq L$, and i is a positive integer; and multiplying the L−N+1 first probabilities that are obtained, and determining a multiplication result as the combination probability corresponding to the candidate segmentation combination.

16. The non-transitory computer readable storage medium according to claim 13, wherein the determining the plurality of candidate text entities comprises:

determining a target field to which the target text belongs; and determining, according to an entity library corresponding to the target field, the plurality of candidate text entities comprised in the target text, the entity library comprising vocabularies that belong to the target field.

17. The non-transitory computer readable storage medium according to claim 13, wherein a candidate segmentation combination corresponding to a largest one of the combination probabilities is determined as the target segmentation combination.

18. The non-transitory computer readable storage medium according to claim 13, wherein the determining the target segmentation combination comprises:

detecting whether a largest one of the combination probabilities is greater than a probability threshold; and based on a largest combination probability being greater than the probability threshold, determining a candidate segmentation combination corresponding to the largest combination probability as the target segmentation combination.

* * * * *